United States Patent [19]

Nakanowatari

[11] Patent Number: 5,046,830
[45] Date of Patent: Sep. 10, 1991

[54] FERROELECTRIC LIQUID CRYSTAL DEVICE WITH SPECIFIC PITCH IN EACH OF A CHOLESTERIC AND A SMECTIC PHASE

[75] Inventor: Jun Nakanowatari, Miyagi, Japan

[73] Assignee: Alps Electric Co., Ltd., Tokyo, Japan

[21] Appl. No.: 649,117

[22] Filed: Jan. 28, 1991

Related U.S. Application Data

[63] Continuation of Ser. No. 321,482, Mar. 8, 1989, abandoned.

[30] Foreign Application Priority Data

May 30, 1988 [JP] Japan .................................. 63-132493

[51] Int. Cl.$^5$ ............................................. G02F 1/13
[52] U.S. Cl. ...................................... 359/90; 359/100; 359/101
[58] Field of Search ................. 350/346, 350 S, 350 R

[56] References Cited

U.S. PATENT DOCUMENTS

| | | | |
|---|---|---|---|
| 3,837,730 | 9/1974 | Hatfield et al. | 350/349 |
| 4,668,051 | 5/1987 | Mourey et al. | 350/350 S |
| 4,943,387 | 7/1990 | Furukawa et al. | 350/350 R |
| 4,969,719 | 11/1990 | Bradshaw et al. | 350/350 S |
| 4,997,264 | 3/1991 | Coulson | 350/350 S |

FOREIGN PATENT DOCUMENTS

| | | |
|---|---|---|
| 61-267738 | 5/1985 | Japan . |
| 60-195521 | 10/1985 | Japan . |
| 60-254120 | 12/1985 | Japan . |
| WO8706021 | 10/1987 | United Kingdom . |

Primary Examiner—Stanley D. Miller
Assistant Examiner—Anita Pellman Gross
Attorney, Agent, or Firm—Guy W. Shoup; Norman R. Klivans

[57] ABSTRACT

A ferroelectric liquid crystal device, in which orientation is applied for either one of both or two substrates having transparent electrodes formed thereon for arranging the liquid crystal molecules in parallel with the substrate and a ferroelectric crystal is filled into the gap between two sheets of the substrates, wherein the ferroelectric liquid crystal has a helical texture pitch in the smectic phase not less than 1 um and not greater than 3.5 micrometers, while having a pitch in the cholesteric phase of not less than 25 micrometers. Also, the length of the gap between the substrates ranges from 6 to 13 micrometers. The light scattering type liquid crystal device capable of storing the state of display and displaying a large picture area at high contrast can be obtained.

1 Claim, 4 Drawing Sheets

PHOTOMUL OUTPUT

DRIVING WAVEFORM (6Hz)

PHOTOMUL OUTPUT

DRIVING WAVEFORM (3Hz)

FERROELECTRIC LIQUID CRYSTAL DEVICE WITH SPECIFIC PITCH IN EACH OF A CHOLESTERIC AND A SMECTIC PHASE

This application is a continuation division of application Ser. No. 07/321,482, filed Mar. 8, 1989, now abandoned

BACKGROUND OF THE INVENTION

1. Field of the Invention

The present invention concerns a liquid crystal device for use in switching devices, display devices, etc. and, more specifically, it relates to a liquid crystal device suitable to a display device of large area having a matrix picture element structure.

2. Description of the Prior Art

A ferroelectric liquid crystal showing the chiral smectic C phase has such a nature that helices are released and optical axes are arranged in one direction when sealed in a gap between two sheets of glass substrates having transparent electrodes formed at the inside. In a liquid crystal cell comprising such a ferroelectric liquid crystal, since the angle of the optical axis of liquid crystal molecules varies depending on the electric field applied thereto, black and white display at high contrast is possible by operating the cell put between two sheets of polarization plates.

The display system of utilizing such birefringence of the ferroelectric liquid crystal is evaluated as being suitable to the matrix display of large picture area since the two conditions, i.e., a display state and a non-display state are switched at high speed depending on the polarity of impressed voltage and, in addition, each of the displayed states is storeable.

However, it has been difficult for the liquid crystal cell of large area to obtain uniform orientation to the entire liquid crystal molecules and a defect such as interlayer staggering of the smectic C phase is liable to occur. In addition, in the case of the smectic C phase, since the viscosity of the liquid crystal is high and the degree of order for the molecular arrangement is also high, different from those in the nematic phase, it has been difficult for the defects once formed to recover spontaneously into the initial state of orientation.

Generation of such a defect gives undesired effects on the display characteristics such as reduction in the display contrast and variation of the threshold voltage.

Further, in order to utilize the expected storeability of the display in the liquid crystal device utilizing the birefringence of the ferroelectric liquid crystal, it is necessary that ON-OFF states can freely be rewritten. However, since the threshold voltage for writing the ON state often differs from that for writing the OFF state because of the deviation in the oriented state of molecules, etc. and since physical properties such as spontaneous polarization, viscosity and elastic constant of the ferroelectric liquid crystal are greatly dependent on the temperature, the temperature range in which the storeability can be effectively utilized is actually narrow.

FIG. 7 shows a relationship between the spontaneous polarization and the temperature and FIG. 8 shows a relationship between the bistable threshold voltage and the temperature, which have been examined for CS-1017 liquid crystal which is a ferroelectric liquid crystals (manufactured by Chisso Co., Ltd.). It can be seen that the temperature dependency is remarkable in either of the cases.

As one of the methods for resolving such problems, TS mode for causing the ferroelectric liquid crystal to reverse the spontaneous polarization by applying AC voltage thereby scattering light has been is proposed (refer to Japanese Patent Laid-Open Sho 60-195521).

In the case of the TS mode, however, although it has a merit that the orientating treatment is not required and the cell can be manufactured with ease, there has been a problem that a driving voltage as high as 50–100 V is necessary and, in addition, time divisional driving is impossible since there is no threshold characteristic between the transmission state and the scattering state.

In view of the above, there has also been proposed a method of causing light scattering by inducing a helical texture (refer to Japanese Patent Laid-Open No. Sho 61-267738). In this method, however, since there is no storeability of display in the light transmission state, there is a problem that a DC electric field has to be applied continuously for maintaining the light transmission state, which degrades the cell in a short period of time.

SUMMARY OF THE INVENTION

The present invention has been achieved in view of the foregoing situations and it is an object thereof to provide a light scattering type ferroelectric liquid crystal device capable of being driven at a low voltage, having satisfactory display storeability, capable of displaying large picture area by time divisional driving and obtaining high contrast.

The foregoing object can be attained in the ferroelectric liquid crystal device according to the present invention in which orientation is applied to either one or both of two substrates each having a transparent electrode formed thereon for arranging the liquid crystal molecules in parallel with the substrate, and a ferroelectric liquid crystal is filled into the gap between the two sheets of the substrates, wherein the ferroelectric liquid crystal has a helical texture pitch in the smectic phase of greater than 1 $\mu$m and less than the length of the gap between the substrates and a pitch in the cholesteric phase of greater than the length of the gap between the substrates.

The gap length between the substrates of the ferroelectric liquid crystal device (hereinafter simply referred to as a cell gap) is desirably set within a range about from 5 $\mu$m ~ 30 $\mu$m. If the cell gap is greater than 30 $\mu$m, it results in a disadvantage that a high voltage is necessary for driving the cell. On the contrary, if the cell gap is less than 5 $\mu$m, there is a disadvantage that selection for the ferroelectric liquid crystal to be used becomes difficult.

When an AC voltage at high frequency is applied to the ferroelectric liquid crystal device, a helical texture is induced. Since the induced helical texture provides a periodical structure of different distribution of refractive index, many domains are formed in the oriented direction of the substrate, that is, in the direction perpendicular to the longitudinal axes of the liquid crystal molecules, causing light scattering of an intense directionality.

The light scattering state remains as it is even after the removal of the impressed voltage and, thus, the display is maintained.

On the other hand, when an AC voltage at low frequency or a DC voltage is applied to the liquid crystal device, the helical texture disappears and it is switched to a transparent mono-domain state. The transparent state is maintained as it is even after removing the voltage.

That is, in the liquid crystal device of the foregoing constitution, it is possible to induce and eliminate the helical texture in the cell by the application of a voltage at an appropriate frequency and, in addition, the induced or eliminated state can be maintained as it is even after the interruption of the voltage application.

DESCRIPTION OF THE ACCOMPANYING DRAWINGS

These and oother objects, as well as advantageous features of the present invention will become apparent by reading the following descriptions for the preferred embodiments according to the present invention in conjunction with the appended drawings, wherein FIG. 1 is a graph illustrating a relationship between the output of a photomultiplier and a driving voltage in a liquid crystal device of Example 1;

Figure 6:
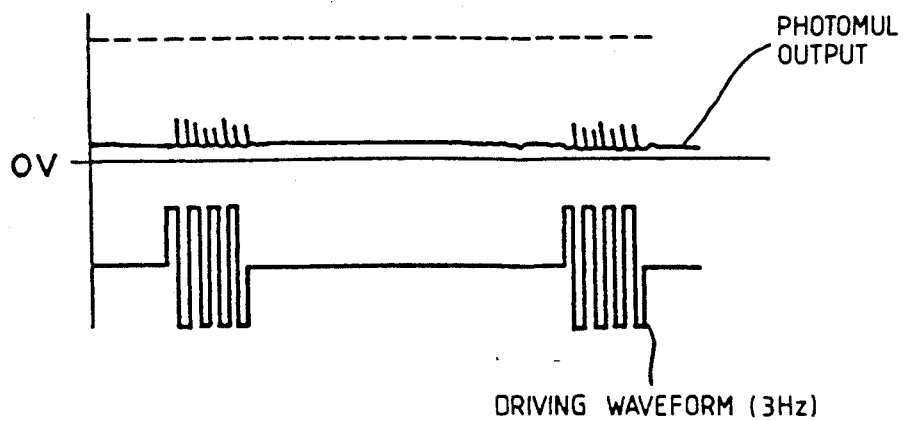
Figure 7:
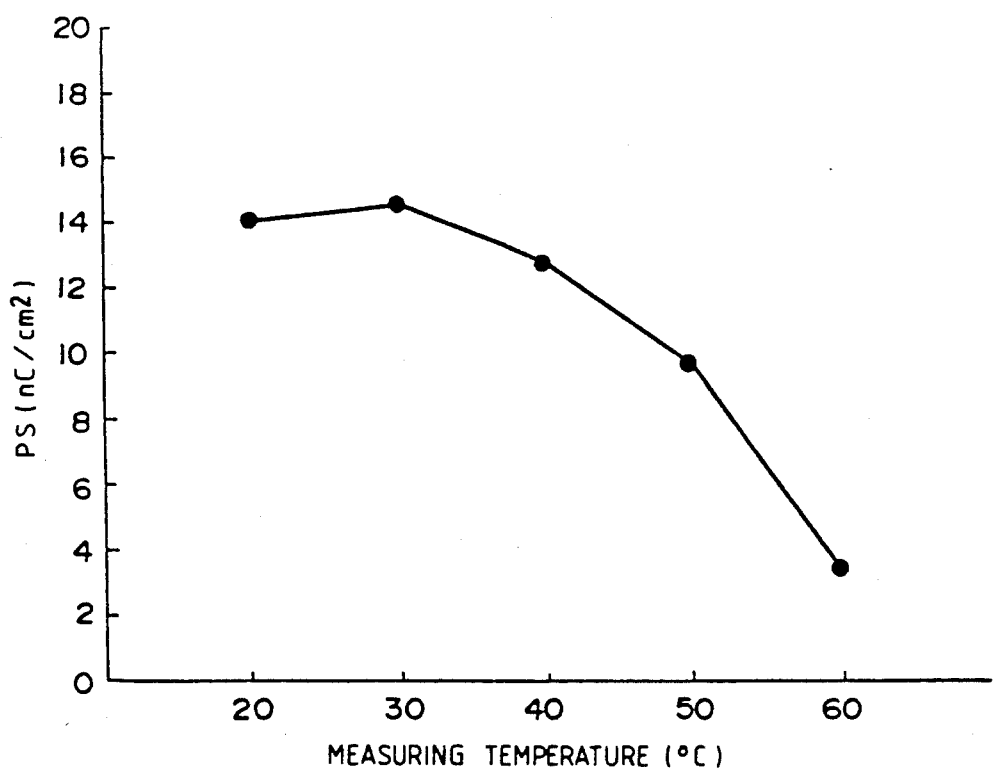
Figure 8:
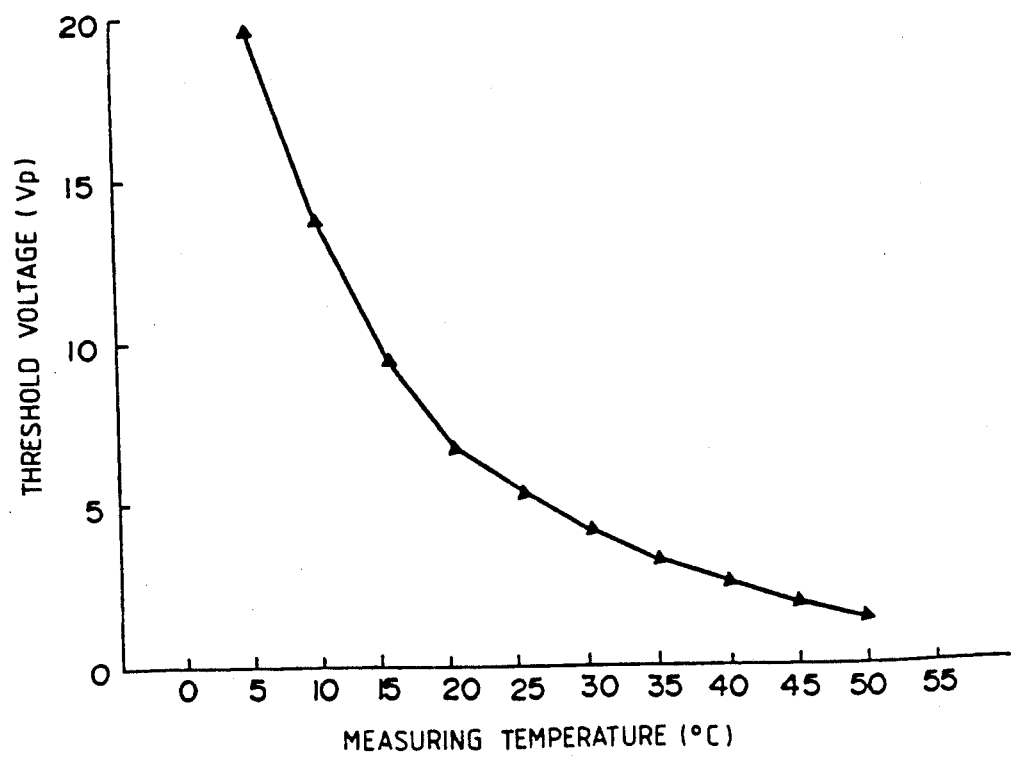

FIG. 6 is a waveform chart for the photomultiplier output when an AC voltage at 3 Hz is applied to the same liquid crystal device FIG. 7 is a graph illustrating the dependency of the spontaneous polarization of the liquid crystal material on the temperature; and FIG. 8 is a graph illustrating the dependency of the threshold voltage on the temperature at which the birefringence type ferroelectric liquid display device becomes bistable.

DESCRIPTION OF THE PREFERRED EMBODIMENT

The present invention is to be described more specifically referring to examples.

EXAMPLE 1

A ferroelectric liquid crystal device was prepared as described below.

After preparing a transparent electrode to the surface for each of two sheets of glass substrates and applying patterning, a polyimide resin (PIQ) (trade name of product manufactured by Hitachi Chemical Co. Ltd.) was coated to a film thickness of 1000 Å by using a spinner.

Then, a photoresist "OFPR-800" (trade name of product manufactured by Tokyo Ohka Kogyo Co. Ltd.) was further coated by using a spinner and, after exposure, development for the resist and the patterning for the polyimide resin film were conducted simultaneously using OFPR liquid developer. Then, after stripping the remaining resist with acetone, heat treatment was applied at 350° C. for 1 hour to harden the polyimide resin film.

Then, the surface of the polyimide resin film was vertically rubbed in such a way as in parallel with the substrate to apply orientation and, thereafter, "Micropearl SB-210" (trade name of product manufactured by Sekisui Fine Chemical Co., Ltd.) as a spacer was scattered on the surface.

Subsequently, thermosetting epoxy resin "SE-4500" (trade name of product manufactured by Yoshikawa Chemical Industry) was applied by way of screen printing to the periphery of the substrate and, after appending two substrates with each other, heated at 140° C. for 90 min to harden them and prepare a cell. Then, when the gap between the two substrates of the thus manufactured cell (cell gap) was measured by a film thickness gauge TM-230N (trade name of product manufactured by Canon Inc.), it was 10.2 $\mu$m.

Ferroelectric liquid crystal "CS-1019" (trade name of product manufactured by Chisso Co., Ltd.) was charged into the cell and, after sealing the charging port with UV curable adhesives, it was cooled gradually from the isometric liquid phase to obtain uniform orientation over the entire cell (mono-domain).

The liquid crystal material used had a helical pitch in the smectic phase of 3.3 $\mu$m which was smaller than the cell gap of 10.2 $\mu$m and a pitch in the cholesteric phase of 25 $\mu$m which was greater than the cell gap.

The cell, which was completely transparent when the voltage was not impressed, produced many domains in the direction perpendicular to the rubbing direction upon applying a rectangular wave of 10–30 V at 200 Hz–1 KHz, by which light was scattered efficiently.

The light scattering state was maintained as it was even when the voltage was reduced to 0 V after the application thereof.

Figure 1:
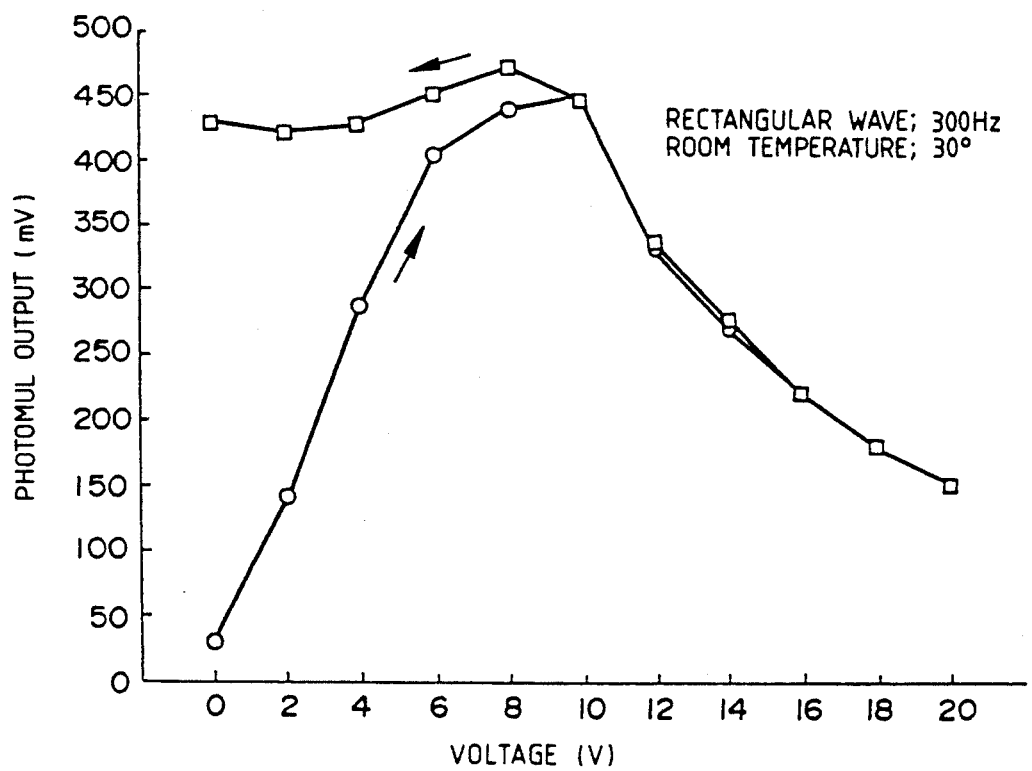

FIG. 1 shows the change of the intensity of the scattering light relative to the voltage in a case when a rectangular wave at 300 Hz was applied.

In this ferroelectric liquid crystal device, since the domains as the center for the light scattering are formed in the specific direction, the distribution of the intensity for the scattering light also had a directionality and light was intensely scattered within the plane in perpendicular to the domains.

Figure 2:
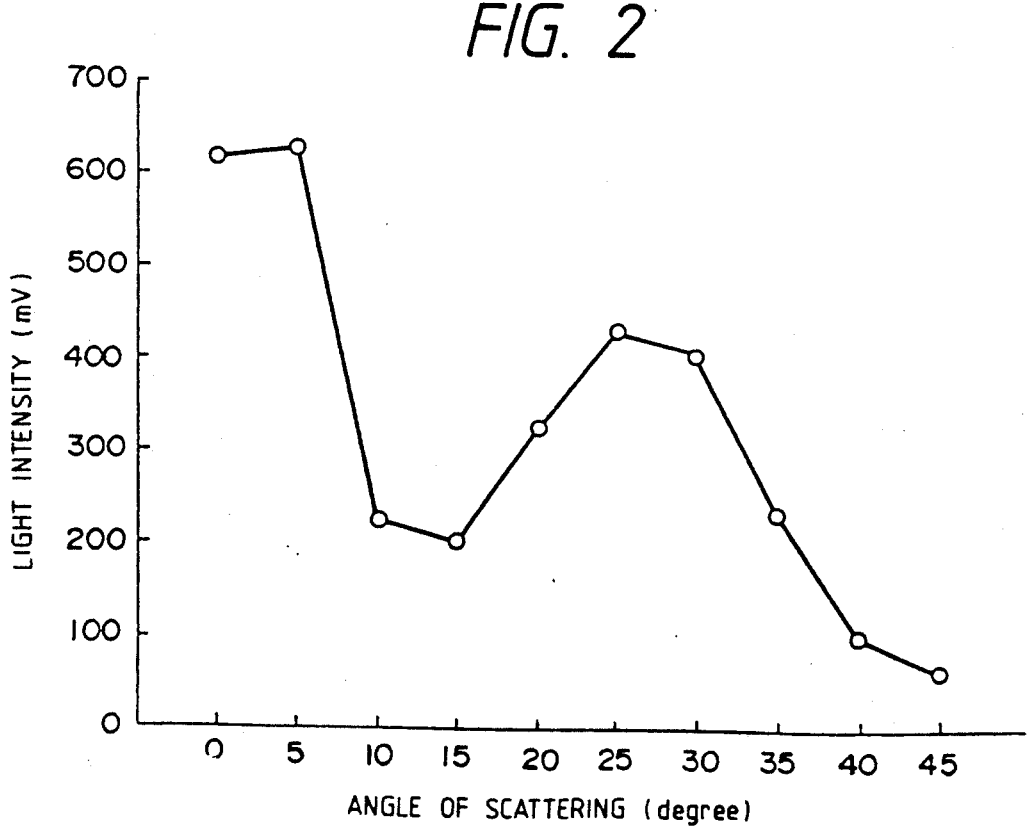
FIG. 2 is a graph illustrating the dependency of the light intensity on the angle of scattering in the liquid crystal device of Example 1.

FIG. 2 shows the change of the intensity of the scattering light when the angle of scattering was varied.

The intensity of the scattering light was conducted by placing a light source at the back of the liquid crystal device and deflecting a photomultiplier, which was set in front of the liquid crystal device, within a plane including the rubbing direction of the liquid crystal device, that is, within a plane in perpendicular to the domain.

Figure 3:
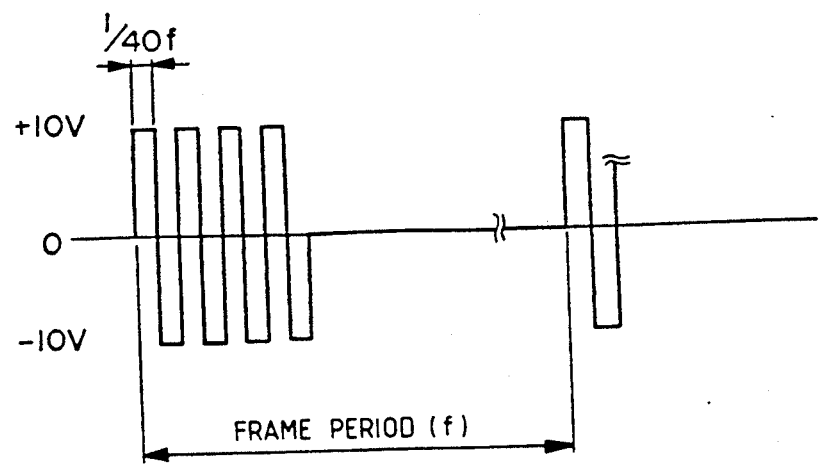
FIG. 3 is a waveform chart illustrating a driving waveform applied upon checking a relationship between the photomultiplier output and the frequency applied in the liquid crystal device of Example 1.
Figure 4:
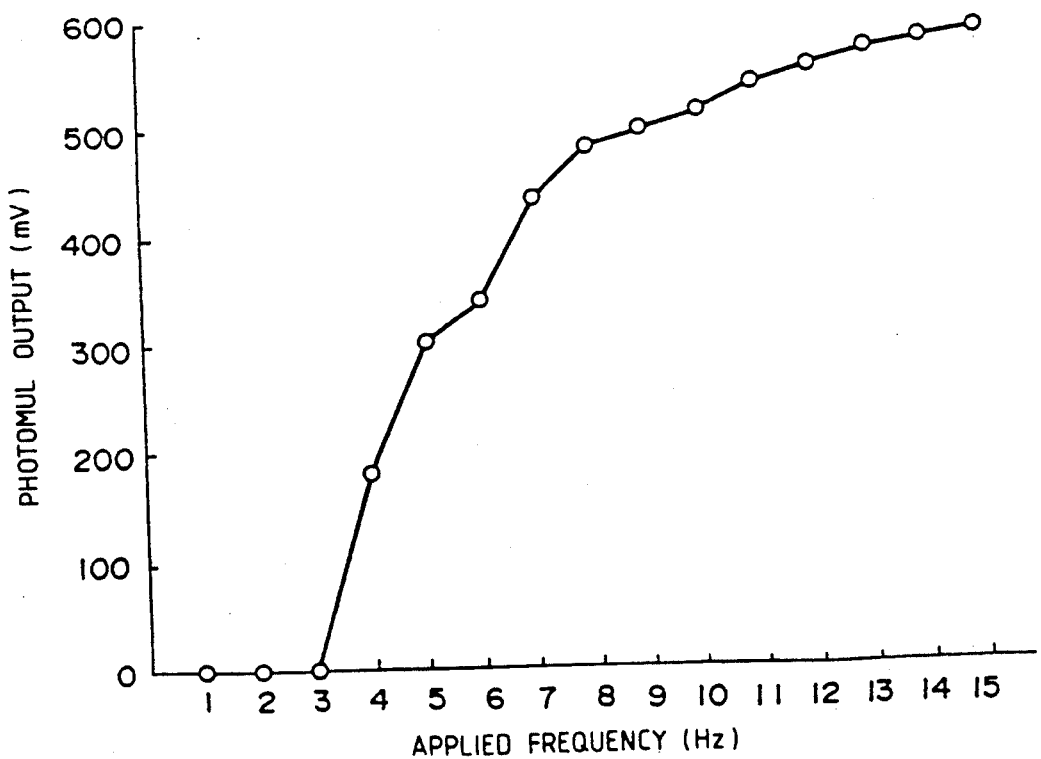
FIG. 4 is a graph illustrating a relationship between the photomultiplier output and the frequency applied in the liquid crystal device of Example 1.
Figure 5:
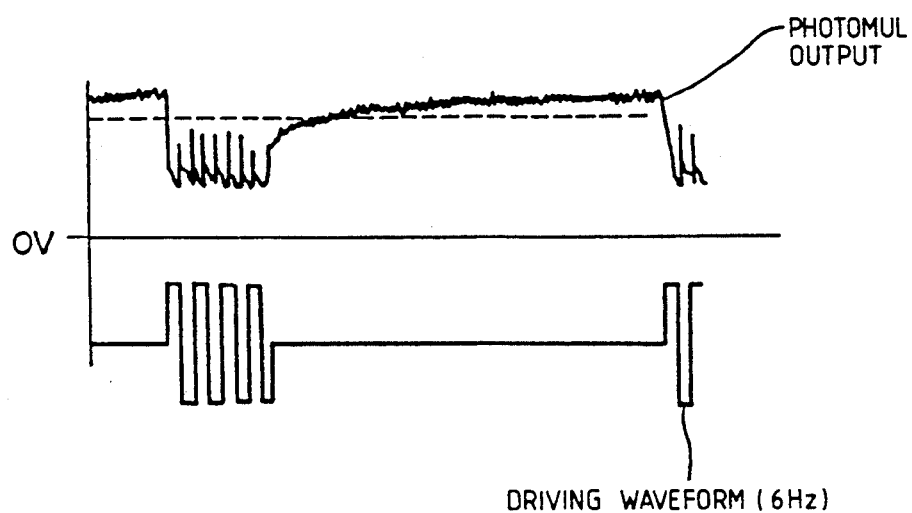
FIG. 5 is a waveform chart for the photomultiplier output when an AC voltage at 6 Hz is applied to the liquid crystal device of Example 1.

As can be seen from the result shown in FIG. 2, an intense scattering was obtained in the vicinity of an angle of 30°. It is considered that this is caused by the formation of the periodical structure for the distribution of the refractive index due to the induced helical texture and, accordingly, diffraction of light in the direction of about 30° was caused. When a driving waveform as shown in FIG. 3 was applied to the cell while varying the frequency, the intensity of the scattering light at the scattering angle of 30° changed as shown in FIG. 4. Further, when the output of the photomultiplier was measured upon application at the frequency of 6 Hz and 3 Hz, waveforms shown in FIG. 5 and FIG. 6 were obtained respectively.

From the results described above, in a case where a driving waveform of ±10 V voltage at a freqency of less than 3 Hz (more than about 8.3 msec as the width for one shot of pulse) was applied, a transparent state was attained with no helical texture, whereas in the case of applying a driving waveform of higher than 4 Hz (less than 6.25 msec of the pulse width), the helical texture is induced to scatter the light. Then, it has been found in this cell that these transparent and scattered states can be maintained even when the applied voltage is reduced to 0 V.

EXAMPLE 2

A cell was prepared under the same conditions as those in Example 1 excepting that polyimide 4110 (trade name of product manufactured by Nissan Chemical Industries Ltd.) was coated on one of the substrates to form an oriented membrane, while silane coupling agent SH6020 (trade name of product manufactured by Toray Silicon Co.) was coated by dipping on the other substrate and orientation with rubbing was applied only to the polyimide coated substrate. Then, after charging the same CS-1019 liquid crystal as described above, the light scattering property and the memory property were measured in the same manner as in Example 1.

As a result, similar results to those in Example 1 were obtained.

EXAMPLE 3

A cell was manufactured under the same conditions as in Example 1 excepting that Alfit PS-12 which is alumina powder of 12 μm grain size (trade name of product manufactured by Showa Denko K.K.) was used as a spacer and the cell gap was set to about 12.6 μm and the same test as in Example 1 was conducted.

As a result, similar light scattering property and memory property to those in Example 1 were confirmed.

EXAMPLE 4

Transparent electrodes were formed at the surface of two glass substrates and, after applying patterning, a polyimide resin (4110) (trade name of product manufactured by Nissan Chemical Industries, Ltd.) was printed to a film thickness of 600 Å using a transfer printing machine.

Then, heat treatment was applied at 250° C. for one hour to harden the polyimide resin film.

Then, after rubbing the surface of the polyimide resin on one substrate to apply orientation, "Micropearl SP-206" (trade name of product manufactured by Sekisui Fine Chemical Co., Ltd.) was scattered to the surface as a spacer.

A thermosetting epoxy resin "SE-4500" (trade name of product manufactured by Yoshikawa Chemical Industry) was printed to the other substrate and, after appending two substrates to each other, they were hardened by heating at 140° C. for 90 min to prepare a cell.

When the gap between the two sheets of substrates of the thus manufactured cell was measured by using a film thickness gage TM-230N (trade name of product manufactured by Canon Inc.), it was 6.2 μm.

Ferroelectric liquid crystal "CS-1017" (trade name of product manufactured by Chisso Co., Ltd.) was charged into the cell and, it was cooled gradually from the isometric liquid phase to obtain uniform orientation over the entire cell. The liquid crystal had a helical pitch in the smectic phase of 1.6 μm which was smaller than the cell gap of 6.2 μm and a pitch in the cholesteric phase of 27 μm which was greater than the cell gap.

The cell, which was completely transparent when the voltage was not impressed, produced many domains in the direction perpendicular to the rubbing direction upon applying a rectangular wave of 10–30 V at 200 Hz–1 KHz, by which light was scattered efficiently.

Since the domains as the center for the light scattering were formed in the specific direction, the distribution of the intensity for the scattering light also had a directionality and light was intensely scattered within the plane perpendicular to the domains.

As in the sample of Example 1, an intense scattering was obtained in the vicinity of an angle of 30°. This is caused by the formation of the periodical structure for the distribution of the refractive index due to the induced helical texture and, accordingly, diffraction of light in the specific direction was caused.

In the same way as in Example 1, the cell has memory property in the light scattering state and the transmission state respectively, and the state could be maintained by reducing the applied voltage to zero.

From the results described above, in a case where a driving waveform of ±10 V voltage at a frequency of less than 5 Hz (more than about 5 msec as the width for one shot of pulse) was applied, a transparent state was attained with no helical texture, whereas in the case of applying a driving waveform of higher than above, the helical texture is induced to scatter the light. Then, it has been found in this cell that these transparent and scattered states can be maintained even when the applied voltage is reduced to 0 V.

EXAMPLE 5

Transparent electrodes were formed at the surface of two glass substrates and, after applying patterning, a polyimide resin (4110) (trade name of product manufactured by Nissan Chemical Industries, Ltd.) was printed to a film thickness of 400 Å using a transfer printing machine. Then, heat treatment was applied at 250° C. for one hour to harden the polyimide resin film.

Then, after rubbing the surface of the polyimide resin on one substrate to apply orientation, "Micropearl SP-210" (trade name of product manufactured by Sekisui Fine Chemical Co., Ltd.) was scattered on the surface as a spacer.

A thermosetting epoxy resin "SE-4500" (trade name of product manufactured by Yoshikawa Chemical Industry) was screen-printed to the periphery of the substrate and, after appending two substrates to each other, they were hardened by heating at 140° C. for 90 min to prepare a cell.

When the gap between the two sheets of substrates of the thus manufactured cell was measured by using a film thickness gage TM-230N (trade name of product manufactured by Canon Inc.), it was 10.2 μm.

A ferroelectric liquid crystal "ZLI-3774" (trade name of products manufactured by Merck) was poured and gradually cooled from the isometric liquid crystal to obtain uniform orientation for the entire cell.

The liquid crystal had a helical pitch in the smectic phase at the room temperature of 4 μm which was smaller than the cell gap of 10.2 μm and a pitch in the cholesteric of 80 μm which was larger than the cell gap.

The cell, which was completely transparent in a state not applied with voltage, produced many domains in the direction perpendicular to the rubbing direction by applying a rectangular waveform of about 10–30 V at 200 Hz–1 KHz thereby enabling it to scatter the light efficiently.

When a rectangular waveform at a frequency of 300–700 Hz was applied, the change of the intensity of the scattering light relative to the voltage showed the same tendency as in the case of Example 1 (refer to FIG. 1).

Since the domains as the center for the light scattering was formed in the specified direction, the distribution for the intensity of scattering light also had a directionality and light was intensely scattered within the plane perpendicular to the domain.

However, the memory property of the light scattering state in this liquid crystal was somewhat weak and the light gradually reduced after removing the applied voltage.

EXAMPLE 6

A cell was prepared under the same conditions as those in Example 5. The cell gap of the cell was 10.0 μm. Ferroelectric liquid crystal ZLI-4140 (trade name of product manufactured by Merck) was charged into the cell. The liquid crystal had a helical pitch in the smectic phase of 6 μm which was smaller than the cell gap of 10.0 μm and a pitch in the cholesteric phase of 200 μm.

When the liquid crystal device was caused to operate, although the memory property was somewhat weak, light scattering was observed.

EXAMPLE 7

A cell prepared was under the same conditions as those in Example 5. The cell gap of the cell was 9.8 μm. Ferroelectric liquid crystal CS-1018 (trade name of product manufactured by Chisso Co. Ltd.) was charged into the cell. The liquid crystal had a helical pitch in the smectic phase of 3 μm which was smaller than the cell gap of 9.8 μm and a pitch in the cholesteric phase of 640 μm.

When the liquid crystal device was caused to operate, light scattering was observed. The memory property was somewhat weak.

EXAMPLE 8

A cell was prepared under the same conditions as those in Example 5. The cell gap of the cell was 10.3 μm. Ferroelectric liquid crystal ZLI-3654 (trade name of product manufactured by Merck) was charged into the cell. The liquid crystal had a helical pitch in the smectic phase of 5 μm which was smaller than the cell gap of 10.3 μm and a pitch in the cholesteric phase of 60 μm.

When the liquid crystal device was caused to operate, although the memory property was also somewhat weak, light scattering was observed.

EXAMPLE 9

A cell was prepared under the same conditions as those in Example 5. The cell gap of the cell was 9.7 μm. Ferroelectric liquid crystal ZLI-3775 (trade name of product manufactured by Merck) was charged into the cell. The liquid crystal had a helical pitch in the smectic phase of 6 μm which was smaller than the cell gap of 9.7 μm and a pitch in the cholesteric phase of 26 μm.

When the liquid crystal device was caused to operate, although the memory property was also somewhat weak, light scattering was observed.

EXAMPLE 10

A cell was prepared under the same conditions as those in Example 5. The cell gap of the cell was 10.5 μm. Ferroelectric liquid crystal ZLI-3938 (trade name of product manufactured by Merck) was charged into the cell. The liquid crystal had a helical pitch in the smectic phase of 4 μm which was smaller than the cell gap of 10.5 μm and a pitch in the cholesteric phase of 50 μm.

When the liquid crystal device was caused to operate, although the memory property was also somewhat weak, light scattering was observed.

COMPARATIVE EXAMPLE

For the comparison, a conventional ferroelectric liquid crystal device was prepared and the memory property was examined.

COMPARATIVE EXAMPLE 1

A cell was manufactured under the same conditions as those in Example 1. The cell gap of the cell was 9.5 μm. Ferroelectric liquid crystal ZLI-3079 having the pitch in the smectic phase greater than the cell gap was charged into the cell. The liquid crystal had a helical pitch in the smectic phase of 13.5 μm which was greater than the cell gap of 9.5 μm. When the liquid crystal device was caused to operate, the light scattering was weak. In addition, it showed no memory property at all.

COMPARATIVE EXAMPLE 2

A cell was manufactured under the same conditions as those in Example 1. The cell gap of the cell was 9.6 μm. Ferroelectric liquid crystal ZLI-3488 having the pitch in the smectic phase greater than the cell gap was charged into the cell. The liquid crystal had a helical pitch in the smectic phase of 10 μm which was greater than the cell gap of 9.5 μm. When the liquid crystal device was caused to operate, the light scattering was extremely weak. In addition, it showed no memory property at all.

The intensity of scattering light at the scattering angles of 20° and 30°, evaluation for the memory property and the pitch of the liquid crystal material used in each of the Examples and Comparative Examples are collectively shown in Table 1.

TABLE 1

| Example | Name of liquid crystal | Intensity of scattering light at 20° (mv) | Intensity of scattering light at 30° (mv) | Cell gap (μm) | Smectic pitch phase (μm) | Cholesteric pitch phase (μm) | Memory property |
| --- | --- | --- | --- | --- | --- | --- | --- |
| 1 | CS-1019 | 385 | 983 | 10.2 | 3.3 | 25 | ○ |
| 2 | CS-1019 | 178 | 862 | 9.7 | 3.3 | 25 | ○ |
| 3 | CS-1019 | 145 | 960 | 12.6 | 3.3 | 25 | ○ |
| 4 | CS-1017 | 204 | 405 | 6.2 | 1.6 | 27 | ○ |
| 5 | ZLI-3774 | 191 | 43 | 10.2 | 4.0 | 80 | Δ |

TABLE 1-continued

| Example | Name of liquid crystal | Intensity of scattering light at 20° (mv) | Intensity of scattering light at 30° (mv) | Cell gap (μm) | Smectic pitch phase (μm) | Cholesteric pitch phase (μm) | Memory property |
| --- | --- | --- | --- | --- | --- | --- | --- |
| 6 | ZLI-4140 | 274 | 109 | 10.0 | 6.0 | 200 | Δ |
| 7 | CS-1018 | 240 | 256 | 9.8 | 3.0 | 15 | Δ |
| 8 | ZLI-3654 | 119 | 32 | 10.3 | 5.0 | 60 | Δ |
| 9 | ZLI-3775 | 210 | 103 | 9.7 | 6.0 | 26 | Δ |
| 10 | ZLI-3938 | 158 | 67 | 10.5 | 4.0 | 50 | Δ |
| Comparative example 1 | ZLI-3079 | 15 | 2 | 9.5 | 13.5 | 70 | X |
| Comparative example 2 | ZLI-3488 | 13 | 0 | 9.6 | 10 | 50 | X |

In the evaluation for the memory property,
"○": scattering intensity not reduced even interrupting the voltage application,
"Δ": scattering intensity reduced gradually after interrupting the application voltage,
"X": no memory property observed.

As has been described above, in the ferroelectric crystal liquid device according to the present invention, since domains are formed in the direction perpendicular to the orientating direction of a substrate when an AC electric field at high frequency is applied and the domain structure is maintained as it is after interrupting the electric field and, on the other hand, a mono-domain transparent state is attained when AC electric field at low frequency is applied and the mono-domain transparent state is maintained after the interruption of the electric field, a light scattering type liquid crystal device using ferroelectric liquid crystal having storeability of the display, capable of display for large picture area due to time divisional driving and obtaining high contrast can be obtained. In addition, driving can be conducted at a low voltage.

What is claimed is:

1. A ferroelectric liquid crystal device, in which orientation is applied for either one or both of two substrates having transparent electrodes formed thereon for arranging the liquid crystal molecules in parallel with the substrates and a ferroelectric liquid crystal is filled into the gap between two sheets of said substrate, wherein said ferroelectric liquid crystal has a helical texture pitch in the smectic phase ranging from 1 micrometer to 3.5 micrometers, while said liquid crystal has a pitch in the cholesteric phase of not less than 25 micrometers, and the gap between said substrates ranges from 6 micrometers to 13 micrometers.

* * * * *